June 13, 1933.    C. A. BARKER    1,914,097
INSULATED ELECTRICAL CONDUIT
Filed Oct. 26, 1927

Inventor:
Charles A. Barker
By
Henry S. Boynton
Atty.

UNITED STATES PATENT OFFICE

CHARLES A. BARKER, OF HIGHLAND PARK, NEW JERSEY, ASSIGNOR TO E. I. DU PONT DE NEMOURS & COMPANY, OF WILMINGTON, DELAWARE, A CORPORATION OF DELAWARE

INSULATED ELECTRICAL CONDUIT

Application filed October 26, 1927. Serial No. 228,980.

This invention relates to a new kind of electrical conduit and more particularly to an electrical conducting wire insulated with a cellulose ester composition.

It is an object of this invention to provide an electrical conducting circuit with a cellulose ester insulation and, preferably, to provide a non-inflammable cellulose ester composition therefor. It is a further object to avoid the necessity of tinning the copper or other wire prior to putting the insulation thereon, as when rubber insulation is provided on copper wire. A still further object is to provide an insulated conduit or wire with a cellulose ester insulating composition which will be able to conduct a current of very high voltage without suffering a breakdown in the insulation at any point in the system. A still further object is to provide an insulated wire which is ozone proof and proof against ultra violet rays or corona. A still further object is to provide such an insulated composition which will be inexpensive as compared with the complete rubber insulation and will not deteriorate in the course of time and will maintain itself on the wire indefinitely in a tough, flexible, unoxidized and unaltered condition.

Figure 1:
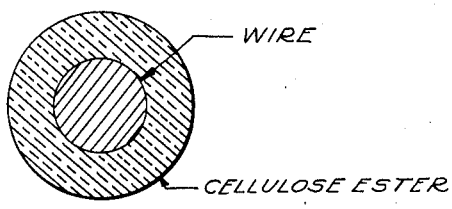
Figure 2:
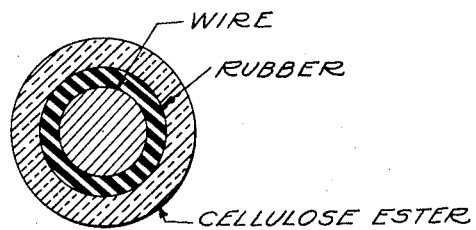

Fig. 1 of the drawing represents a section taken through a conductor made in accordance with the invention and illustrating a single insulating coating of cellulose ester applied to the wire. Fig. 2 represents a modification in which a plurality of superimposed insulating layers are employed. In the figures the thickness of the layers has been somewhat exaggerated, no special attempt being made to show proportions.

In the preferred embodiment of the invention, the composition is provided as follows:

| | Parts |
|---|---|
| Cellulose acetate | 20 |
| Triacetin | 30 |
| Magnesium carbonate | 25 |
| Rottenstone | 25 |

This composition is formed into a plastic mass and then applied to the wire in the following manner: A suitable form of apparatus is used which will extrude the composition through a die having a circular cross-section and the wire is passed through the center of the section or orifice as the extrusion proceeds so that the wire will be uniformly coated with the plastic mass and leave the extrusion apparatus in the center of the coating so provided thereon. The plastic dries out very rapidly and the wire thus insulated may be immediately wound upon a reel without further handling. There will thus be provided an insulated wire having a cellulose acetate composition thereon without any intermediate tinning of the wire, and this cellulose acetate composition will not support combustion and will resist high voltages. The insulation is also resistant to change due to the atmosphere or ageing and may be used directly for underground conduits without any other coating.

Instead of coating the wire directly, there may first be formed a hollow tube of the composition by expressing or extruding it through a die having a central core so that the composition thus extruded will assume the general form of macaroni, and in fact, similar apparatus may be used in the manufacture. The plastic mass so formed will dry rapidly, as aforesaid, and will require no further treatment except to slip it over the wire when the final assembly is made. No tinning of the copper wire is necessary in this embodiment.

In place of the aforesaid composition, other plastic compositions may be prepared on a cellulose ester basis and they may, preferably, be provided with fire retardant materials to make the composition non-imflammable so that it will not ignite from a match, or electric spark, etc. Other plasticizers than triacetin may be used and fillers other than rottenstone and the carbonate. Triphenyl phosphate or tricresyl phosphate, latent solvents, dibutyl phthalate, cork, ochre, oils, etc., may be used in such a cellulose ester composition.

By avoiding the use of rubber in the foregoing embodiments, no subsequent vulcanization need be performed, and thus a great deal of time may be saved. The rapid drying of the plastic makes it possible to reel the coil almost immediately after extrusion without any further treatment or precaution. The insulation thus produced is much better than complete rubber insulation, will last longer and will maintain a high voltage. From an electrical standpoint, the insulated wire is superior to the wire heretofore used in that the insulation is unaffected by ozone and the wire is corona-proof.

However, I have found that an insulated wire may be prepared by first putting a rubber insulation on the wire and surrounding this with a cellulose ester plastic. In this case, known equivalents of rubber may be inserted in its place. In this embodiment also, the wire would preferably be tinned before the rubber or similar material is brought into contact with it.

A braid, or wrapping, may be wound around the wire either before or after coating with the cellulose ester, or both operations may be performed.

As many apparently widely different embodiments of this invention may be made without departing from the spirit thereof, it is to be understood that I do not limit myself to the foregoing example or description except as indicated by the following patent claims.

I claim:

1. A high voltage electrical conductor having upon its surface a plastic, ozone- and corona-proof, non-inflammable, insulating coating of substantial thickness comprising cellulose acetate, triacetin, magnesium carbonate and rottenstone.

2. A high voltage electrical conductor having upon its surface a plastic, ozone- and corona-proof, non-inflammable, insulating coating of substantial thickness comprising 20 parts cellulose acetate, 30 parts triacetin, 25 parts magnesium carbonate and 25 parts rottenstone.

In testimony whereof, I affix my signature.

CHARLES A. BARKER.